July 19, 1966

C. R. AMSLER ET AL 3,261,214

SPRING DRIVEN GYROSCOPE

Filed Aug. 27, 1964

INVENTORS.
CLYDE R. AMSLER
RAYMOND L. WAID

BY

*Fred H. Schmuck*

ATTORNEY.

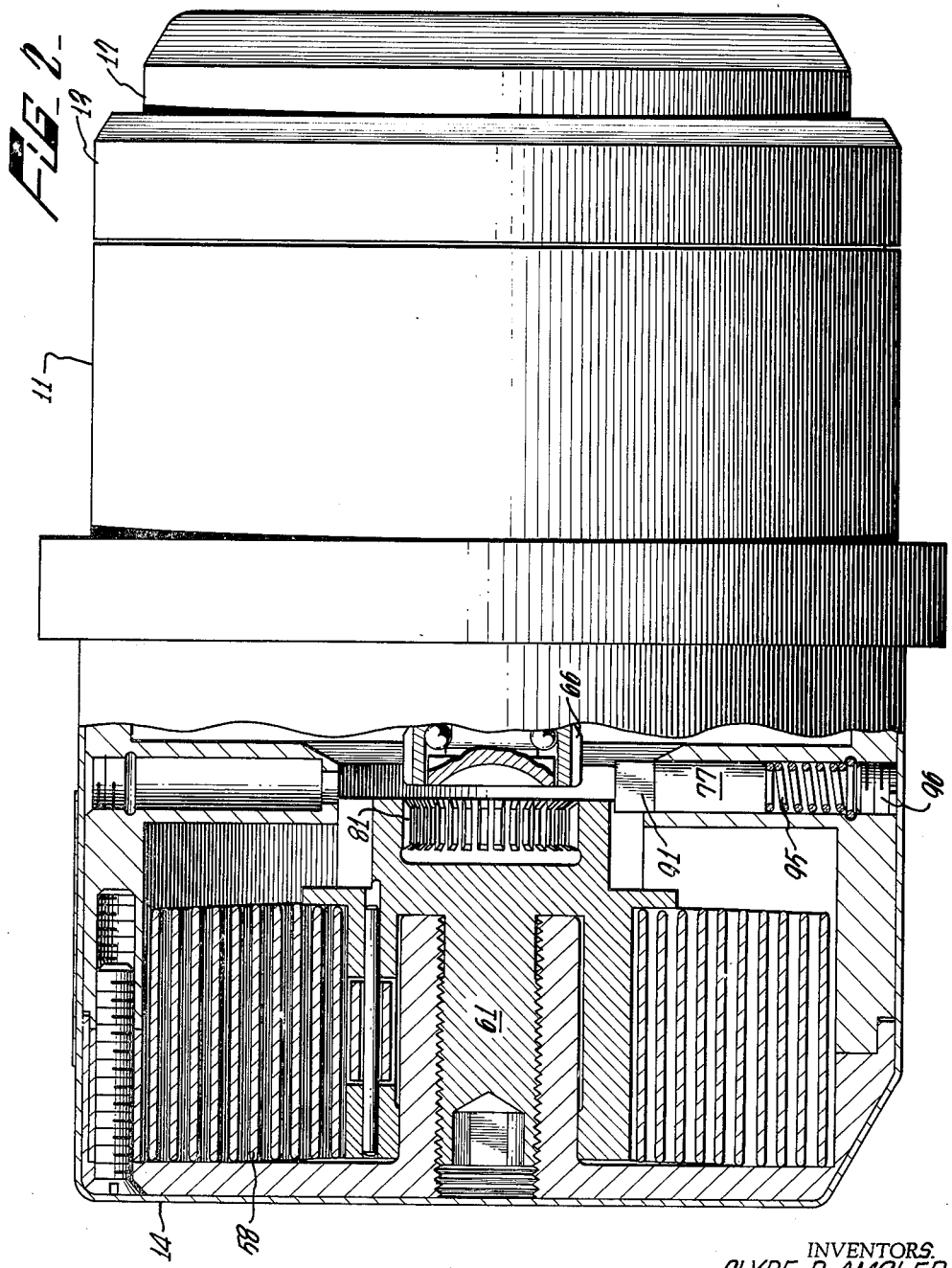

INVENTORS.
CLYDE R. AMSLER
RAYMOND L. WAID
BY
ATTORNEY.

United States Patent Office 3,261,214
Patented July 19, 1966

3,261,214
SPRING DRIVEN GYROSCOPE
Clyde R. Amsler, San Gabriel, and Raymond L. Waid, La Puente, Calif., assignors to Clary Corporation, San Gabriel, Calif., a corporation of California
Filed Aug. 27, 1964, Ser. No. 392,426
6 Claims. (Cl. 74—5.12)

This invention relates to gyroscopes and has particular reference to spring driven gyroscopes in which the rotor is driven up to a relatively high speed within a short period of time by the spring and then is allowed to coast. This type of gyroscope is particularly valuable in controlling guided missiles and the like, having a relatively short flight time.

Gyroscopes of the above type are generally held in caged condition and are uncaged at the time of firing the missile. Normally, the rotor is brought up to full operating speed prior to launching of the missile and is then disconnected from the drive just prior to uncaging so that it can exert a controlling or indicating function while running free.

Since missiles of the above type must often be fired at precise times and quite often no advance notice is given to enable the rotor to be brought up to controlling speed, it is imperative that such rotor be brought to speed abruptly. Such action, in addition to the launching acceleration which may approach 100 times the force of gravity, combined with vibrations encountered during flight of the missile, imparts severe shocks to the gyroscope. At the same time, in relatively small missiles, severe limitations are placed on the size and weight of the gyroscope while still requiring a high degree of accuracy and reliability. On the other hand, since such missiles are expendable, it is highly desirable that the gyroscope be inexpensive while being rugged enough to withstand the aforementioned shock and vibration.

It therefore becomes a principal object of the present invention to provide a spring driven gyroscope which is small and light in weight and yet rugged enough to withstand extreme shock loads.

Another object is to provide a gyroscope of the above type which is highly accurate and yet inexpensive to manufacture.

The manner in which the above and other objects of the invention are accomplished will be readily understood on reference to the following specification when read in conjunction with the accompanying drawings, wherein:

FIG. 2 is an elevational view, partly in section and similar to FIG. 1 but illustrating the drive mechanism in retracted position after bringing the rotor up to speed.

Figure 1:
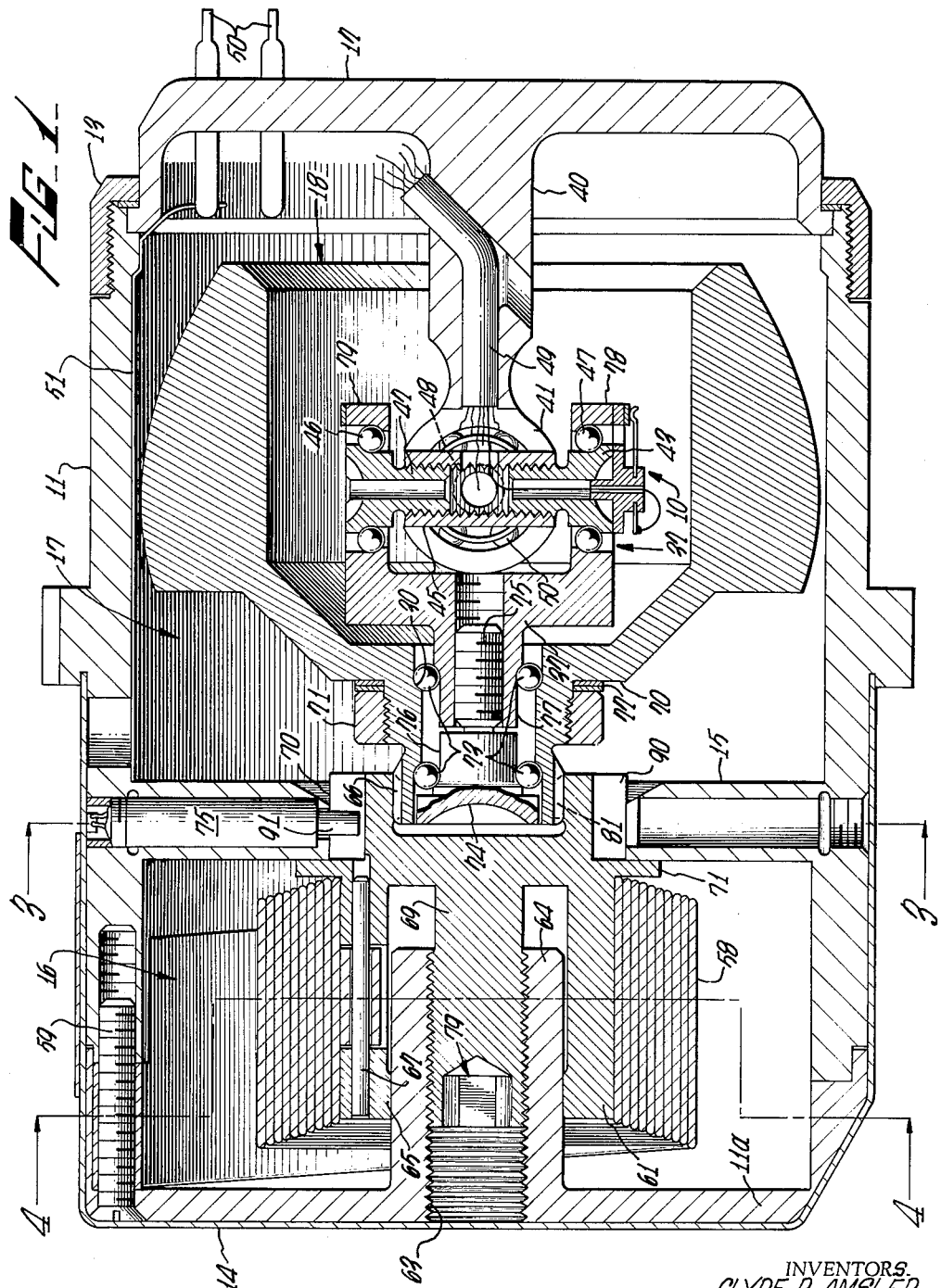
FIG. 1 is a longitudinal sectional view through a gyroscope embodying a preferred form of the present invention, and illustrating the same in the wound condition.
Figure 4:
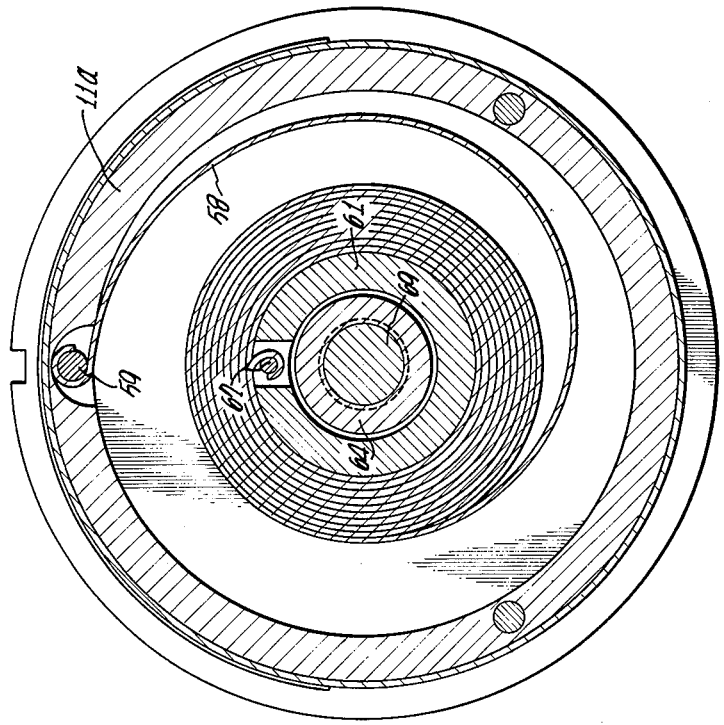
FIG. 4 is a transverse sectional view through the spring drive means and is taken along the line 4—4 of FIG. 1.

Referring to the drawings, the gyroscope comprises a cylindrical case 11 to the right hand end of which is secured an end cap 12 which forms a pedestal 40 terminating into a yoked end 41. The end cap is held in place by a clamp nut 13 which is threadably attached to the case 11. A removable cover 14 is suitably attached to the opposite end of the case. The cover 14 extends over a cup-shaped bulkhead member 11a held in place against the forward edge of the case 11 by screws 59. The member 11a has an inwardly extending hollow hub 64 integral therewith.

The case 11 defines an annular wall 15 to form a drive compartment 16 on one side thereof and a rotor compartment 17 on the opposite side thereof.

A hollow rotor generally indicated at 18 is mounted in the rotor compartment. The rotor has a hub 20 which carries a balance weight 21 threadably attached thereto. A pair of shims 22 are provided to affect minor adjustments of the weight.

The rotor is rotatably mounted on a gimbal member 32 by ball bearings 23. The bearings are retained by a screw 24 which is threaded at 25 into one end of the member 32, thereby retaining one row of bearings on a shaft section 27 of the member and the other row on a shaft section 26 formed on the screw 24.

The gimbal member 32 is formed at its right hand end into a bifurcated yoke, comprising two spaced arms 28 and 29. The spaced arms support a pair of hollow coaxial shaft sections 42 and 43 threadably secured to a center block 45 through ball bearings 46 and 47. The center block, comprising a second gimbal member, is in turn pivotally supported by a second pair of coaxial shaft sections, one of which is indicated at 48. The latter are supported by ball bearings, i.e. 50, carried by the yoked inner end 41 of the pedestal 40. The axes of the shaft sections 42, 43, and 48 are mutually perpendicular to each other and to the spin axis of the rotor to permit universal movement of the case 11 relative to such spin axis. Such axes also intersect each other.

Suitable attitude pick-off devices, one of which is generally indicated at 10, are carried by the member 28 and the pedestal 40. These may be of any well-known construction. The leads for these devices pass through axial openings in the shaft sections of the center block 45 and merge into a protective cable 49 which passes through an opening in the pedestal 40. They are then connected to terminal connectors 50.

Describing now the spring drive motor, the latter is contained in the drive compartment 16 and comprises a spiral torsion spring 58, which is suitably attached at its outer end to the case 11 by one of the screws 59 and is attached at its inner end to a spindle or drive member 61 by a pin 62.

The drive member 61 is rotatably supported at 65 adjacent one end on the hub 64 and is rotatably supported at 70 adjacent at its opposite end within a bearing formed in the wall 15. A central extension 69 on the drive member is screw threaded to the interior of the hub 64.

When the drive member 61 is rotated by means of a suitable tool inserted in a socket 79 thereof to wind the spring 58, such drive member will advance axially along the hub 64, causing splines 81 therein to mesh with mating splines 66 formed on the hub 20 of the rotor. Thus, the splines 66 serve to connect the drive member to the rotor and also accurately cage the latter. In the fully wound condition of the spring, as shown in FIG. 1, a flange 71 on the drive member limits against the annular wall 15.

Three equi-spaced notches 90 are formed in the portion of the drive member journaled in the wall 15 and any one of these may be engaged by a latch pin 91 to latch the spring it its energized condition.

The latch pin 91 forms part of an explosive squib 75 which is located in a radially extending hole formed in the wall 15. The squib is electrically connected to certain of the terminal connectors 50 by way of a flexible etched circuit connector 51 which is suitably bonded to the internal surface of the case 11. Upon applying an electric charge to the conductors leading to the squib 75, the latter is exploded to withdraw the pin 91, allowing the spring 58 to quickly rotate the drive member and rotor to operating speed. As the drive member 61 rotates it is drawn axially toward its outer position shown in FIG. 2 and as it approaches such position the splines 81 are uncoupled from the mating splines of the rotor, thus leaving the latter free to rotate in an uncaged condition.

Figure 3:
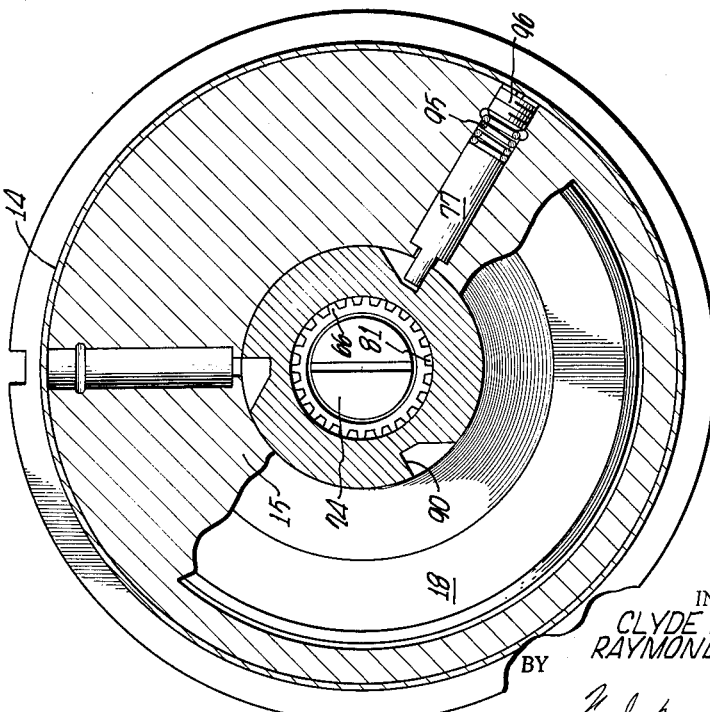
FIG. 3 is a transverse sectional view illustrating the spring latching mechanism and is taken substantially along the line 3—3 of FIG. 1.

In order to wind the spring 58, the squib 75 is removed and a special latch 77 (FIG. 3) is mounted in a second radially extending hole in the wall 15. The latter hole is located approximately 120° from the hole for receiving the squib. The latch 77 is yieldably pressed against the drive member by a compression spring 95 held against the latch 77 by a retainer screw 96. Thus, as the drive member is rotated to wind the spring, the latch pin 77 engages the different notches 90 until the spring is fully wound. Thereupon, the squib 75 is replaced in its hold and the latch 77 is removed.

It will be noted that the wall 15 and flange 71 effectively seal the rotor compartment from any contaminates, such as heavy lubricating agents, which are applied to the spring 58 and which might otherwise affect the operation of the rotor, gimbal means or pick-off devices.

Although the invention has been described in detail and certain specific terms and languages have been used, it is to be understood that the present disclosure is illustrative rather than restrictive and that changes and modifications may be made without departing from the spirit or scope of the invention as set forth in the claims appended hereto.

Having thus described the invention what is desired to be secured by the United States Letters Patent is:

1. A gyroscope comprising a rotor having a first coupling part, means supporting said rotor for rotation about a spin axis and for movement about mutually perpendicular axes, a gyroscope housing supporting said last mentioned means, an extension integral with said housing, a drive member rotatably mounted on said extension for movement therealong toward and away from said rotor, said drive member having a combined coupling and caging part engageable with said first coupling part whereby to drive and cage said rotor, means forming a screw threaded connection between said drive member and said extension whereby to advance said drive member away from said rotor upon rotation of said drive member, a spiral spring attached at one end thereof to said housing and at the other end thereof to said drive member for rotating said drive member, means on said drive member forming a ratchet wheel, a release pawl engageable with said ratchet wheel, and means for moving said pawl to release said ratchet wheel.

2. A gyroscope comprising a rotor having a first coupling part, means supporting said rotor for rotation about a spin axis and for movement about mutually perpendicular axes, a gyroscope housing supporting said last mentioned means, an extension integral with said housing and extending inwardly from the center of one end of said housing, a drive member rotatably mounted on said extension for movement therealong toward and away from said rotor, said drive member having a combined coupling and caging part engageable in said first coupling part whereby to drive and cage said rotor, means responsive to rotation of said drive member for moving said drive member away from said rotor, a spiral spring attached at one end thereof to said housing and at the other end thereof to said drive member for rotating said drive member, a release pawl engageable for said drive member, and means for moving said pawl to release said drive member.

3. A gyroscope comprising a rotor having a first coupling part, means supporting said rotor for rotation about a spin axis and for movement about mutually perpendicular axes, a gyroscope housing supporting said last mentioned means, an extension integral with said housing and extending from the center of one end of said housing, a radially inwardly extending flange on said housing intermediate said rotor and said end, a drive member rotatably mounted adjacent one end thereof on said extension and rotatably mounted adjacent the opposite end thereof in said flange, said drive member having a combined coupling and caging part engageable with said first coupling part whereby to drive and cage said rotor, means forming a screw threaded connection between said drive member and said extension, a spiral spring attached at one end thereof to said housing and at the other end thereof to said drive member for rotating said drive member, means on said drive member forming a ratchet wheel, a release pawl engageable with said ratchet wheel, and means for causing said pawl to release said ratchet wheel.

4. A gyroscope comprising a rotor having a first coupling part, means supporting said rotor for rotation about a spin axis and for movement about mutually perpendicular axes, a gyroscope housing supporting said last mentioned means, a tubular extension integral with said housing and extending from the center of one end of said housing, a radially inwardly extending flange on said housing intermediate said rotor and said end, a drive member rotatably mounted adjacent one end thereof on said extension for movement therealong toward or away from said rotor, said drive member being rotatably mounted adjacent the opposite end thereof in said flange, said drive member having a combined coupling and caging part engageable with said first coupling part whereby to drive and cage said rotor, means forming a screw threaded connection between said drive member and the interior of said extension, a spiral spring attached at one end thereof to said housing and at the other end thereof to said drive member for rotating said drive member, a release pawl engageable with said drive member, and means for moving said pawl to release said drive member.

5. A gyroscope comprising a rotor having a first coupling part, means supporting said rotor for rotation about a spin axis and for movement about mutually perpendicular axes, a gyroscope housing supporting said last mentioned means, an extension integral with said housing and extending from the center of one end of said housing a radially inwardly extending flange on said housing intermediate said rotor and said end, a drive member rotatably mounted adjacent one end thereof on said extension, said drive member having a bearing portion adjacent the opposite end thereof rotatably mounted in said flange, said drive member having a combined coupling and caging part engageable with said first coupling part whereby to drive and cage said rotor, means forming a screw threaded connection between said drive member and said extension, a spiral spring attached at one end thereof to said housing and at the other end thereof to said drive member for rotating said drive member, whereby to move said drive member from driving and caging relation with said rotor, a release pawl carried by said flange and engageable with said ratchet means, and means for moving said pawl to release said drive member.

6. A gyroscope comprising a rotor having a first coupling part, means supporting said rotor for rotation about a spin axis and for movement about mutually perpendicular axes, a gyroscope housing supporting said last mentioned means, a tubular extension integral with said housing, a drive member rotatably mounted on said extension for movement therealong toward and away from said rotor, said drive member having a combined coupling and caging part engageable with said first coupling part whereby to drive and cage said rotor, a projection on said drive member extending in screw threaded engagement with the interior of said extension, coupling means on said projection for coupling said projection to a rotating tool inserted into the interior of said extension, a spiral spring attached at one end thereof to said housing and at the other end thereof to said drive member for rotating said drive member, a release pawl engageable to said drive member, and means for removing said pawl to release said drive member.

References Cited by the Examiner

UNITED STATES PATENTS

| | | | |
|---|---|---|---|
| 1,296,331 | 3/1919 | Shonnard | 74—5.12 |
| 2,911,832 | 11/1959 | Thierman | 74—5.7 |

FOREIGN PATENTS 211,412　11/1957　Australia.

BROUGHTON G. DURHAM, *Primary Examiner.*

J. D. PUFFER, *Assistant Examiner.*